United States Patent
Boeinghoff et al.

[19]
[11] Patent Number: 6,131,058
[45] Date of Patent: Oct. 10, 2000

[54] PROCESS FOR IDENTIFYING AN INCORRECTLY MEASURING SENSOR IN A SPACECRAFT

[75] Inventors: Albert Boeinghoff, Bad Aibling; Ernst Bruederle, Ottobrunn, both of Germany

[73] Assignee: DaimlerChrysler AG, Stuttgart, Germany

[21] Appl. No.: 09/293,765

[22] Filed: Apr. 19, 1999

[30] Foreign Application Priority Data

Apr. 17, 1998 [DE] Germany .............................. 198 16 978

[51] Int. Cl.$^7$ .................................................. G01M 17/00
[52] U.S. Cl. .................................. 701/34; 701/13; 701/4; 244/158 R; 244/171; 244/164; 342/62; 356/139.03
[58] Field of Search .............................. 701/34, 220, 13, 701/4; 244/158 R, 171, 164; 342/62; 73/178 R; 356/139.01, 139.03

[56] References Cited

U.S. PATENT DOCUMENTS

| | | | |
|---|---|---|---|
| 4,617,634 | 10/1986 | Izumida et al. | 701/222 |
| 4,658,361 | 4/1987 | Kosaka et al. | 701/13 |
| 5,452,869 | 9/1995 | Basuthakur et al. | 244/164 |
| 5,535,965 | 7/1996 | Surauer et al. | 244/164 |
| 5,572,316 | 11/1996 | Zaffanella et al. | |
| 5,957,982 | 9/1999 | Hughes et al. | 701/13 |
| 5,984,238 | 11/1999 | Surauer et al. | 244/171 |
| 5,996,941 | 12/1999 | Surauer et al. | 244/165 |

FOREIGN PATENT DOCUMENTS

| | | |
|---|---|---|
| 0 488 594 A1 | of 1991 | European Pat. Off. |
| 2 090 497 | of 1981 | United Kingdom . |

*Primary Examiner*—William A. Cuchlinski, Jr.
*Assistant Examiner*—Olga Hernandez
*Attorney, Agent, or Firm*—Evenson, McKeown, Edwards & Lenahan, P.L.L.C.

[57] ABSTRACT

In a process for identifying an incorrectly measuring sensor which is part of a sensor arrangement on a spacecraft, external directional vectors are measured, relative to external objects, such as the earth, the sun or selected stars, or to external field vectors, such as the earth's magnetic field. Based on actual time and space coordinates of the spacecraft, respective actual external directional vectors are calculated with respect to an inertial system of coordinates, and the angles between these vectors are determined. These angles are compared with corresponding angles which exist between the directional vectors measured by a function of the sensor arrangement relative to a spacecraft-fixed system of coordinates. Based on this comparison a sensor which may measure incorrectly can be identified reliably.

3 Claims, 1 Drawing Sheet

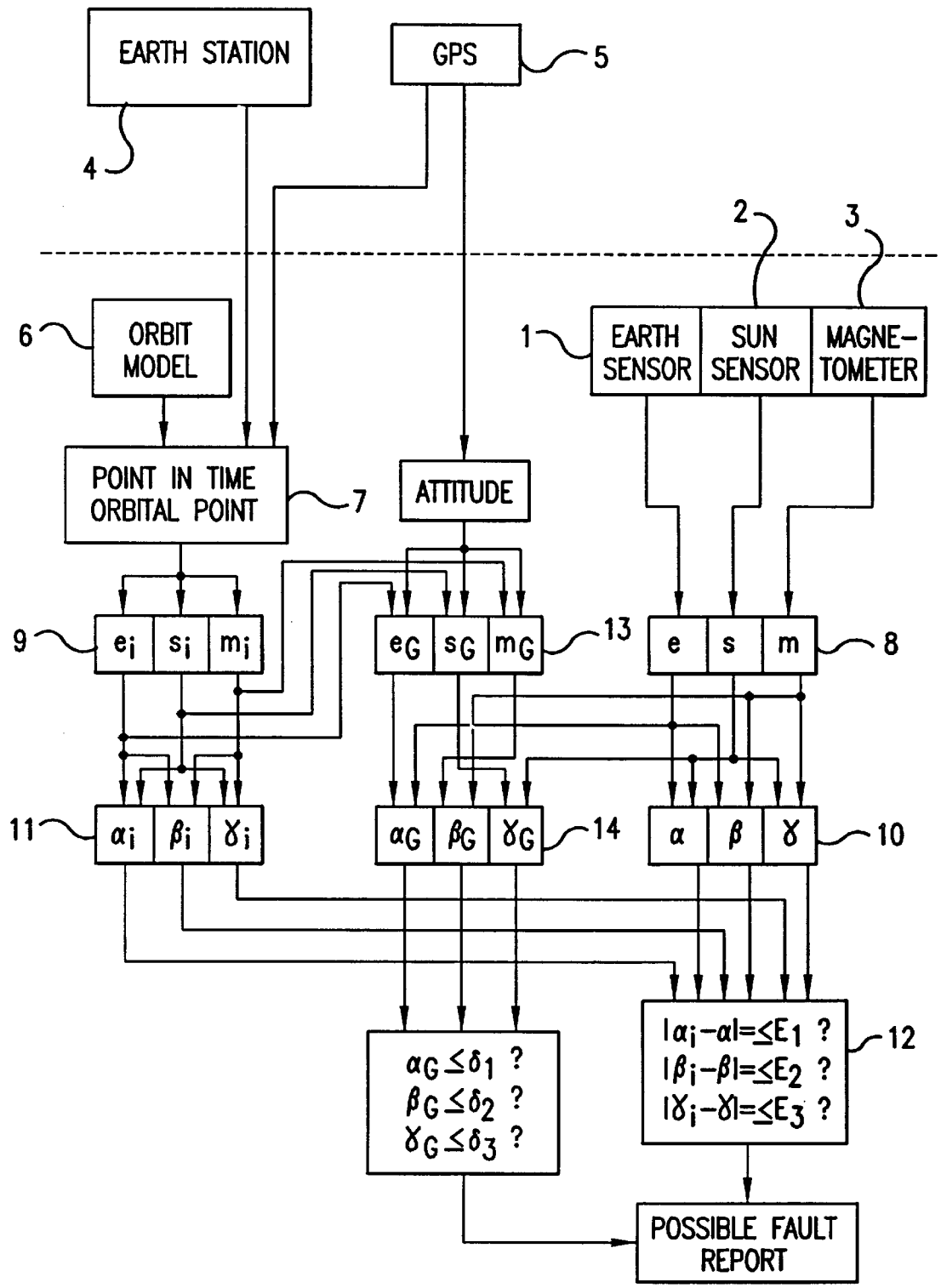

PROCESS FOR IDENTIFYING AN INCORRECTLY MEASURING SENSOR IN A SPACECRAFT

BACKGROUND AND SUMMARY OF THE INVENTION

This application claims the priority of German patent document 198 16 978.7, filed Apr. 17, 1998, the disclosure of which is expressly incorporated by reference herein.

The invention relates to a process for identifying an incorrectly measuring sensor which is part of a sensor arrangement in a spacecraft for measuring directional vectors.

Spacecraft, particularly earth satellites which must maintain a predetermined orientation on their orbit with respect, for example, to a defined orbital system of coordinates, are equipped with attitude control systems. The latter must have sensors whose measurements provide three-axis attitude information. In the case of earth satellites, these may include for example, earth sensors, sun sensors, star sensors or magnetometers. Earth, sun and star sensors measure directional vectors, which indicate the direction of external objects (specifically the earth, the sun or selected stars) with respect to the actual location of the spacecraft. In the case of an earth satellite, a magnetometer measures the intensity and the direction of the earth's magnetic field at the actual location of the satellite, and a corresponding directional vector is also obtained.

All such directional vectors may be expressed as unit vectors relative to a spacecraft-fixed system of coordinates, which may consist, for example, of three orthogonal axes X, Y, Z. In the case of an earth satellite, these axes are usually aligned with the Z-axis (yaw axis) pointing to the center of the earth; the X-axis (roll axis) pointing in the orbiting direction; and the Y-axis (pitch axis) situated perpendicularly on the two other axes or the orbiting plane of the spacecraft.

From the measured directional vectors, conclusions can be drawn concerning any incorrect orientation of the spacecraft about one or several of the three axes of the spacecraft-fixed system of coordinates, if the vectors do not correspond to definable reference vectors. The orientation of the spacecraft can then be corrected by means of corresponding control elements which generate controlling torques, such as reaction nozzles, swirl wheels or magnetic torque generators.

In attitude control systems of this type, it is very important that errors in the measurement of the attitude or of the direction vectors be recognized automatically in order to prevent major negative effects of such a sensor error in time. Known error recognition measures consist of a plausibility examination of the measured values of the sensor. Plausibility criteria include for example, whether a measurement remains absolutely constant over a longer period of time, whether it results only in values within a certain range, or whether the change of a measurement exceeds a certain extent. Such monitoring frequently requires high programming expenditures if, for example, an angle measurement consists of many partial measurements, each of which can be incorrect. Furthermore, they are difficult to implement because the pertaining error limits cannot easily be indicated. If the latter are too stringent, they are exceeded too easily without the actual presence of an error. However, if they are too lax, an error may not be recognized in time.

It is therefore an object of the present invention to provide a process by means of which incorrectly measuring sensors can be recognized more effectively.

This and other objects and advantages are achieved by the process according to the invention, in which the respective actual external directional vectors are first computed with respect to an inertial system of coordinates, using information concerning the actual point in time as well as the actual location of the spacecraft. Alternatively, the mentioned information can be received via an earth station, determined by analyzing GPS data on board the spacecraft, or determined by means of a time-dependent model of the orbital course of the spacecraft stored on board the spacecraft. For example, in the case of an earth satellite, such an inertial system of coordinates can be selected in which one axis is aligned perpendicularly with respect to the earth orbit plane; the second axis is aligned in parallel to the direction of the sun center-spring point of the earth orbit; and the third axis is aligned perpendicularly to the two above-mentioned axes. This system of coordinates may be conceived to be centered in the center of the earth and orbit along with the earth on its path around the sun. According to the date and the time of day, and with the additional knowledge of the location of the earth satellite on its orbit, the directional vectors which are of interest can then be calculated: for example, the earth vector which is directed from the location of the satellite to the center of the earth; the sun vector directed toward the center of the sun; one or several star vectors directed to preselectable stars; as well as finally the magnetic field vector which exists in each case at the satellite location. The thus calculated directional vectors are related to the inertial system of coordinates.

According to the invention, the angles are then determined between the above-mentioned directional vectors, as well as the angles between directional vectors measured directly by the sensors. In the first-mentioned case, these angles are therefore determined between directional vectors which are defined in the inertial system of coordinates; and in the second case, between such directional vectors which are defined in the satellite-fixed or spacecraft-fixed system of coordinates. However, the angles themselves are independent of the system of coordinates in which they were each calculated. That is, if measured and calculated correctly, the corresponding angles (for example, the angle between the earth and sun vectors calculated in the inertial system of coordinates and the same angle measured in the spacecraft-fixed system of coordinates) must be identical.

Accordingly, the angles which correspond to one another with respect to the participating directional vectors (for example, the two above-mentioned angles which extend in each case between for the earth and sun vectors), from the two systems of coordinates are compared with one another. This comparison between the angles is independent of the actual alignment of the spacecraft or of the system of coordinates on which the directional vectors are based.

A sensor will be identified as measuring incorrectly if only in this comparison of angles all of those angles which are determined based on the directional vector measured by this sensor deviate from one another by more than a definable minimum amount.

The GPS data received by GPS satellites also permit a determination of the actual attitude of the spacecraft. From the latter, as well as from the information concerning the location and point in time (also received), the directional vectors can then be calculated with respect to the spacecraft-fixed system of coordinates. As a result, it is possible to make a comparison between these calculated directional vectors and the directional vectors measured on board the satellite by means of the sensors. The result of this comparison can then also be used to decide whether a sensor is measuring incorrectly.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a functional block diagram which illustrates an embodiment of the error identification system according to the invention.

DETAILED DESCRIPTION OF THE DRAWINGS

As shown in the FIGURE, an earth sensor 1, a sun sensor 2 and a magnetometer 3 are arranged on board a spacecraft (not shown). (The components and functions located in the spacecraft are separated from those external to it by a broken line.) A ground station 4 as well as a GPS satellite system 5 (GPS=Global Positioning System) are shown as external information suppliers. An orbit model 6 may be stored on board in the spacecraft.

The first condition for the functioning of the process according to the invention is that certain directional vectors can be determined, on the one hand, with respect to the spacecraft-fixed system of coordinates and, on the other hand, with respect to a preselectable inertial system of coordinates. In the embodiment, the former case (step 8) involves the directional earth vector e measured by the earth sensor 1, the sun vector s measured by the sun sensor 2, and the magnetic field vector m measured by the magnetometer 3. These are represented as unit vectors in the spacecraft-fixed system of coordinates. In the latter case, on the other hand, corresponding directional vectors are determined (step 9) relative to an inertial system of coordinates (specifically an inertial earth vector ei, an inertial sun vector $s_i$ as well as an inertial magnetic field vector $m_i$).

An exact knowledge of the actual orbital point as well as of the associated point in time (step 7) is required to determine the above-mentioned directional vectors relative to the inertial coordinate system. For this purpose, an inertial system of coordinates is assumed which is centered at the location of the spacecraft and is carried along by it. It can then be calculated, based on general regularities, which orientation (and therefore which components) have the selected directional vectors with respect to the selected inertial system of coordinates at any point in time. Information concerning the actual orbital point in space and time can be obtained in any of various ways: for example, from an orbit model 6 carried on board the spacecraft (with a clock detecting the time sequence), by telemetry from an earth station 4, or by means of a GPS receiver 5 situated on board the spacecraft from an external GPS satellite system.

In a next process step 10, the respective angles $\alpha$, $\beta$ and $\gamma$ between the directional vectors e, s and m measured in the spacecraft-fixed system of coordinates (that is, between e and s, e and m, s and m) are then calculated. In parallel thereto, the corresponding angles $\alpha_i$, $\beta_i$ and $\gamma_i$ between the directional vectors $e_i$, $s_i$, and $m_i$ (defined in the inertial system of coordinates) are then calculated (step 11). The following therefore applies:

$\alpha$=arccos $(es^T)$ $\beta$=arccos $(em^T)$ $\gamma$=arccos $(ms^T)$ as well as $\alpha_i$=arccos $(e_i s_i^T)$ $\beta_i$=arccos $(e_i m_i^T)$ $\gamma_i$=arccos $(m_i s_i^T)$ In the process step 12 which follows, a comparison is made to determine whether the mutually corresponding angles are identical or deviate from one another only by a tolerably small amount. The result of this comparison can then supply the information of whether one of the participating sensors is measuring incorrectly (step 13). In that case, a corresponding fault report will then be made.

If, for example, the difference between the angle $\alpha_i$ and the angle $\alpha$ exceeds a definable tolerance threshold $\epsilon_1$ (step 12), a faulty measurement may exist in either the earth sensor 1 or the sun sensor 2. If at the same time the difference between the angle $\beta_i$ and the angle $\beta$ is also too large, but not that between the angle $\gamma_i$ and the angle $\gamma$, the error must relate to the earth sensor 1 because the earth vector e which it measures affects the determination of both the angle a and the angle $\beta$. In contrast, since the difference between the angles $\gamma_i$ and $\gamma$ is in the permissible range, the conclusion is justified that the sun sensor 2 as well as the magnetometer 3 are measuring correctly.

When a GPS receiver is present on the spacecraft, information which it provides can be used to further substantiate whether and where a faulty measurement exists, since the actual attitude of the spacecraft (that is, the orientation of its spacecraft-fixed system of coordinates with respect to the selected inertial system of coordinates), can also be determined from the received GPS signals. The previously calculated inertial direction vectors $e_i$, $s_i$ and $m_i$ (step 9) can then be transformed into the spacecraft-fixed system of coordinates, in which case, however, a so-called inertial basis is used. This results in the directional vectors $e_G$, $s_G$ as well as $m_G$ (step 13).

In an additional facultative process step, these directional vectors can now be compared with the directional vectors e, s and m which originate from the sensor measurements and also relate to the spacecraft-fixed system of coordinates. In this comparison, the respective angles are determined between the mutually corresponding directional vectors (step 14); thus, for example, an angle $\alpha_G$ between the directional vectors $e_G$ as well as e, etc. If the measurement of the sensors is correct, these angles should be approximately equal to zero, assuming a correct functioning of the GPS system.

The angles $\alpha_G$, $\beta_G$ as well as $\gamma_G$ are therefore defined as follows:

$\alpha_G$=arccos $(ee_G^T)$ $\beta_G$=arccos $(mm_G^T)$ $\gamma_G$=arccos $(ss_G^T)$ If one of these angles exceeds a definable tolerance threshold, it can be assumed that the corresponding sensor is measuring incorrectly. This information can be used to substantiate the above-mentioned primary decision.

The above described approach will now be illustrated by means of a numerical example, in which the presence of a functioning GPS system is a prerequisite.

It is assumed that the sensor measurements result in the following directional vectors:

e=(0.0, 0.0, 1.0)$^T$ s=(−0.673, 0.303, 0.675)$^T$ m=(0.461, −0.8, 0.385)$^T$

This results in the angles $\alpha$=47.54°

$\beta$=67.4°

$\gamma$=107.0°

It is assumed that the following values are obtained for the directional vectors determined relative to the inertial system of coordinates:

$e_i$=(0.5, 0.5, 0.707)$^T$ $s_i=(-0.3, 0.6, 0.742)^T$ $m_i=(0.8, -0.5, 0.332)^T$

The pertaining angles amount to $\alpha_i=47.58°$ $\beta_i=67.37°$ $\gamma_i=107.08°$ Already on the basis of these values, the information can be obtained that there are obviously no sensor faults, because the comparison of the angles $\alpha_i$ and $\alpha$, $\beta_i$ and $\beta$, $\gamma_i$ and $\gamma$ shows that the existing differences are below a threshold which in this case, may, for example, be set at 2°. This result is confirmed by considering those directional vectors which follow from the attitude information of the GPS system, specifically:

$e_G=(0.0, 0.0, 1.0)^T$ $s_G=(-0.673, 0.303, 0.675)^T$ $m_G=(0.461, -0.8, 0.385)^T$

The comparison of the values for e and $e_G$, s and $s_G$ and m and $m_G$ therefore shows that the angles between these vectors are each equal to zero:

$\alpha_G=0.0°$ $\beta_G=0.0°$ $\gamma_G=0.0°$

A conclusion with respect to a magnetometer fault can be drawn if, for example, the following value is obtained for the directional vector m measured by the magnetometer:

$m=(0.5, -0.5, 0.707)^T$

The following values are now obtained for the relevant angles:

$\alpha=47.54°$ $\beta=45.0°$ $\gamma=90.6°$ $\alpha_G=0.0°$ $\beta_G=25.5°$ $\gamma_G=0.0°$ The comparison of the values $\alpha$, $\beta$, $\gamma$ with the above-mentioned values for $\alpha_i$, $\beta_i$, $\gamma_i$ determined relative to the inertial system of coordinates clearly indicates that all angle measurements in connection with the magnetometer exceed the fault limit, and that the magnetometer must therefore be measuring incorrectly. This is confirmed by the value for $\beta_G$ which deviates considerably from zero.

The following additional example will show that a fault exists in the GPS system. It is assumed that, deviating from the above examples, the following values are obtained for the corresponding directional vectors:

$e_G=(0.0, 0.707, 0.707)^T$ $s_G=(-0.673, 0.691, 0.263)^T$ $m_G=(0.461, -0.293, 0.838)^T$

This results in the angle values which clearly differ from zero:

$\alpha_G=45.0°$ $\beta_G=32.9°$ $\gamma_G=39.7°$

Such a configuration clearly points to a GPS fault.

With respect to unambiguousness in determining or confirming a fault in a particular sensor, the following variants may also be important which are based on special sensor configurations:

In many cases, the sensors are redundant and measuring values from the redundant sensors can also be used to recognize faults (hot redundancy). In such a case, those directional vectors are first compared with one another which are measured by the two redundant sensors. If these measured directional vectors are sufficiently identical, the measurement of this sensor type is considered to be correct. A majority decision will then no longer be required if a faulty angle is determined between the directional vector measured by means of this sensor and the directional vector measured by means of a different sensor.

However, if the comparison between the directional vectors indicates a fault, a directional vector is determined by the measurement of the main sensor as well as by that of the redundant sensor. A majority decision will then also no longer be required because it can be assumed that another sensor does not become defective at the same time and the comparison of angles by means of another sensor will therefore isolate the fault.

An earth sensor may also consist of three different measuring heads which are arranged in the satellite and which each permit a single-axis measurement. The earth vector in the spacecraft-fixed system of coordinates can then be determined from measurements by two heads. A comparison of the measurements of all three heads yields information as to whether one of the three heads supplies a faulty measurement. If an existing earth sensor defect is recognized in this manner, it is not possible by means of this method to identify the defective measuring head. Here also, a majority decision is not required if it can be assumed that one of the sensors participating in the comparison of angles is measuring correctly. If a fault is now determined during the evaluation of the measurements of the three measuring heads, a directional vector is determined from two measurements respectively; on the whole, therefore three directional vectors. Two of these vectors contain the defective measuring head, but one has no defect. If the angles are compared with a directional measurement by another sensor type, the defective measuring head can be identified without a majority decision: The two measuring heads whose vectors do not result in a fault when comparing angles are measuring correctly. The third measuring head is the defective one.

Finally, there are hot redundant sensors which are frequently capable of supplying so many measurements that just from measurements of this sensor type a defect can be determined and identified in this sensor. This sensor can then always provide a correct directional vector for the comparison with other sensors. An example of the above is a sun sensor which consists of several parts, each of which has a different installation direction and is able to generate a sun vector by means of redundant measurements. The different sun sensor parts have the purpose of expanding the visual field of the sensor, and are arranged with overlapping areas in which measurements are made which permit four sun vector determinations, each resulting from different measurements. A majority decision within the sun sensor measurements can then be made.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for identifying an incorrectly measuring sensor in a sensor arrangement on a spacecraft for measuring external directional vectors relative to a spacecraft-fixed system of coordinates, which directional vectors indicate directions of external objects with respect to an actual location of the spacecraft, or external field vectors at the actual location of the space craft, said process comprising:

measuring respective external directional vectors with respect to a spacecraft-fixed system of coordinates based on signals from said sensor arrangement;

calculating respective external directional vectors with respect to an inertial system of coordinates, based on information concerning an actual point in time and actual location of the spacecraft;

determining angles between individual directional vectors measured by means of the sensor arrangement, and angles between calculated individual directional vectors;

comparing angles which correspond to one another with respect to participating directional vectors from the two systems of coordinates; and identifying a particular sensor as measuring incorrectly if all angles determined based on a directional vector measured by the particular sensor deviate from one another by more than a definable minimum amount.

2. Process according to claim 1 wherein information concerning the actual point in time and the actual location of the spacecraft is obtained by at least one of the following: information received by an earth station, evaluation of GPS data on board the spacecraft, and determination based on a time-dependent model of an orbital path of an spacecraft stored on board the spacecraft.

3. Process according to claim 1, further comprising:

using received GPS data to determine actual attitude of the spacecraft;

calculating direction vectors with respect to the spacecraft-fixed system of coordinates based on the actual attitude of the spacecraft, and on information concerning the point in time and the location of the spacecraft;

comparing the calculated directional vectors and the directional vectors measured by means of the sensors; and using a result of the comparison in deciding whether a sensor exists which is measuring incorrectly.

* * * * *